F. R. KUNKEL.
COMMUTATOR FOR ELECTRICAL MACHINES.
APPLICATION FILED OCT. 7, 1908.
928,918.
Patented July 20, 1909.
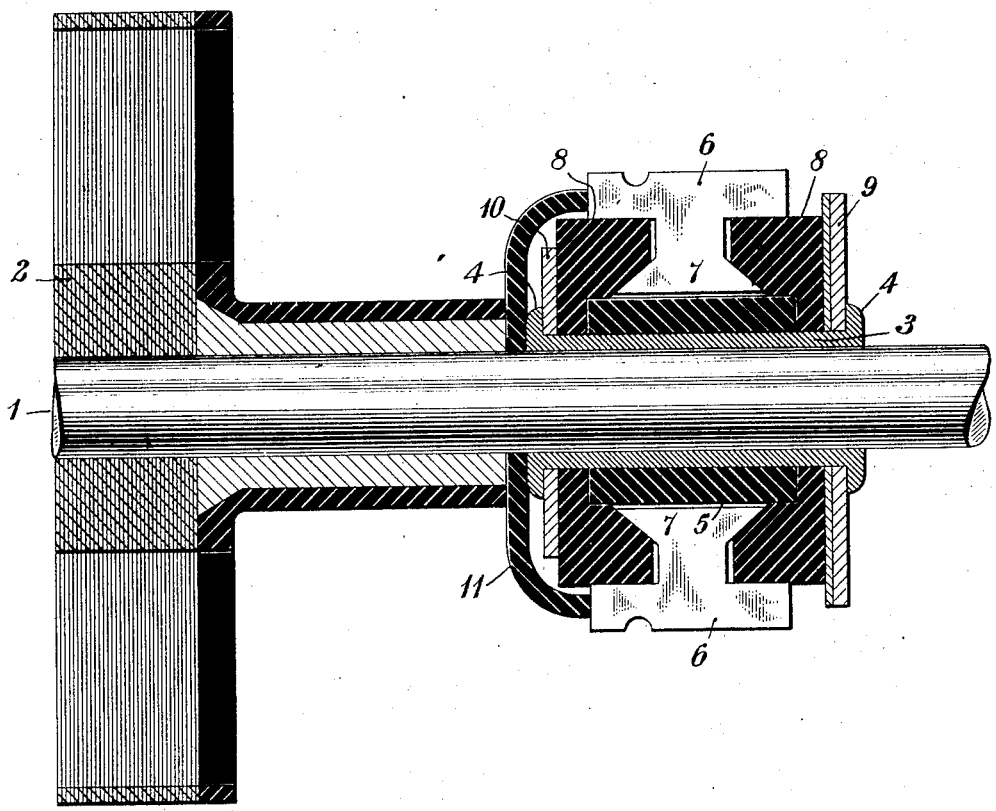
WITNESSES:
C. L. Belcher
Otto S. Schairer.
INVENTOR
Fred R. Kunkel
BY
Shirley E. Carr
ATTORNEY

UNITED STATES PATENT OFFICE.

FRED R. KUNKEL, OF EDGEWOOD PARK, PENNSYLVANIA, ASSIGNOR, BY MESNE ASSIGNMENTS, TO WESTINGHOUSE ELECTRIC & MANUFACTURING COMPANY, OF EAST PITTSBURG, PENNSYLVANIA, A CORPORATION OF PENNSYLVANIA.

COMMUTATOR FOR ELECTRICAL MACHINES.

No. 928,918.  Specification of Letters Patent.  Patented July 20, 1909.

Original application filed January 10, 1908, Serial No. 410,221. Divided and this application filed October 7, 1908. Serial No. 456,637.

*To all whom it may concern:*

Be it known that I, FRED R. KUNKEL, a citizen of the United States, and a resident of Edgewood Park, in the county of Allegheny and State of Pennsylvania, have invented a new and useful Improvement in Commutators for Electrical Machines, of which the following is a specification, this being a division of application Serial No. 410,221, filed January 10, 1908.

My invention relates to commutators for electrical machines, and it has for its object to provide a commutator cylinder for small motors having a small number of parts, the combination and arrangement of which shall be such as to insure economy of manufacture, lightness and compactness of structure, and durability in service.

The single figure of the accompanying drawing is a longitudinal section through the commutator cylinder and a portion of the armature core of a motor embodying my invention.

Since my invention relates solely to the commutator cylinders of electrical machines, I have deemed it necessary to illustrate only a commutator cylinder and those portions of the machine which are directly connected thereto and associated therewith in mechanical relations.

Mounted upon a shaft 1 are an armature core 2 and a metal sleeve 3, the latter being shown as having its ends upset to form flanges 4 for clamping the other portions of the commutator cylinder together and thus make a single structure which may be mounted upon and removed from the shaft as a unit, though I do not desire or intend to limit my invention to this specific clamping means. Surrounding the sleeve 3 and in close contact therewith is a cylinder 5 of insulating material, and surrounding the cylinder 5 are the commutator bars or segments 6, the said bars or segments being insulated from each other by suitable material (not shown), in the usual well known manner. The inner ends of the bar 6 are enlarged to form bases 7 of dovetail form, and in the spaces between the heads and bases are fitted insulating collars 8, the inner faces of which are so formed as to fit against the faces of the parts 5 and 6. Outside the insulating rings 8 are metal disks 9 and 10, between which are clamped the parts 6 and 8. The inner end of the structure just described is protected by means of an insulating cap 11.

In case the sleeve 3 is provided with two integral end flanges 4 for holding the commutator parts together in proper coöperative relation, the flange at one end will preferably be formed by upsetting the metal, or otherwise, before the parts 6, 7, 8, 9 and 10 are assembled, and, after these parts are assembled, the flange 4 at the other end of the sleeve will be formed by upsetting the metal against the end plate 9 or the end plate 10, as the case may be, the parts being thus securely clamped between the flanges 4. It is apparent, therefore, that the commutator cylinder parts are securely held together upon the sleeve 3 in such manner that they may readily be placed in position upon the shaft and removed therefrom as a unit.

It will be understood from the foregoing description that the commutator cylinder may be readily and inexpensively manufactured, and that, when its parts are assembled, they are securely held in proper relative positions.

Minor structural variations from what I have shown and described may be made, if desired, without departing from my invention.

I claim as my invention:

1. A commutator cylinder for dynamo-electric machines comprising conducting segments having dove-tail projections, insulating collars embracing the dove-tail projections, reinforcing disks for the insulating collars, and a supporting sleeve for the said parts having integral flanges at its ends for clamping them together.

2. A commutator cylinder for dynamo-electric machines comprising conducting segments having dove-tail projections, insulating collars embracing the dove-tail projections, reinforcing disks for the insulating collars, a supporting sleeve for the said parts having means for clamping them together, and a sleeve surrounding the aforesaid sleeve to insulate the segments therefrom.

3. A commutator cylinder for dynamo-electric machines comprising conducting segments having dove-tail projections, insulating clamping rings embracing the said projections, and a supporting sleeve for the said parts having integral flanges at its ends for clamping them together.

4. A commutator cylinder comprising segments having laterally projecting inner ends, opposing insulating clamping members to engage said inner ends, and a supporting sleeve for said parts having integral flanges at its ends for clamping them together.

In testimony whereof, I have hereunto subscribed my name this 2nd day of October, 1908.

FRED R. KUNKEL.

Witnesses:
M. J. BRANSON,
BIRNEY HINES.